Patented Jan. 23, 1940

2,187,853

UNITED STATES PATENT OFFICE 2,187,853

DYESTUFF-SULPHONIC ACIDS OF THE DIOXAZINE SERIES

Heinrich Greune and Max Thiele, Frankfort-on-the-Main-Hochst, and Gerhard Langbein, Hofheim in Taunus, Germany, assignors to General Aniline Works, Inc., New York, N. Y., a corporation of Delaware No Drawing. Original application January 20, 1936, Serial No. 59,994. Divided and this application September 1, 1938, Serial No. 228,050. In Germany January 23, 1935

1 Claim. (Cl. 260—246)

The present invention relates to dyestuff-sulphonic acids of the dioxazine series.

This application is a division of U. S. Patent No. 2,139,617, patented Dec. 6, 1938 (application Serial No. 59,994, filed January 20, 1936, in the name of Heinrich Greune, Max Thiele and Gerhard Langbein, for Dyestuff-sulphonic acids of the dioxazine series and a process of preparing them).

We have found that valuable dyestuff-sulphonic acids are obtainable by treating a di-arylaminobenzoquinone derivative of the general formula

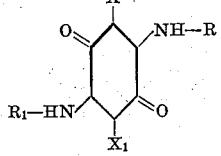

wherein R and $R_1$ represent a sulphonated diaryl, diaryl ether, diaryl sulphide or diaryl urea radical and X and $X_1$ stand for hydrogen, alkyl, aryl or halogen, with an acid or alkaline condensing agent preferably in the presence of an organic or inorganic oxidizing agent.

By treating with condensing agents of the above kind, ring closure with formation of dioxazine rings occurs; by using sulphuric acid or fuming sulphuric acid as condensing agent, further sulpho-radicals may simultaneously enter into the dyestuff molecule.

Thus, there are obtained new dyestuffs, for instance, those of the following general formula

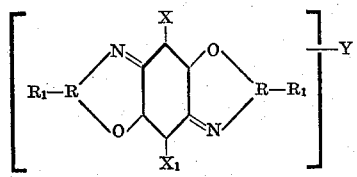

wherein X and $X_1$ represent hydrogen, halogen, alkyl or aryl, R represents an aryl radical, $R_1$ represents a radical of the group consisting of -aryl, -O-aryl, -S-aryl and -NH-CO-NH-aryl, and wherein each group $$R_1-R\diagup$$

of the formula contains a sulphonic acid group and Y means that the compounds may contain further sulphonic acid groups, and the salts of these compounds.

The benzoquinone derivatives used as starting materials may be made easily by condensing in water or alcohol, if desired, with addition of an acid binding agent, a 1.4-benzoquinone, for instance, benzoquinone, toluquinone, dichlorobenzoquinone, tetrachlorobenzoquinone with a sulphonic acid of an amino-diaryl, amino-diaryl ether, amino-diaryl sulphide or aminodiaryl urea or a substitution product thereof.

The easy accessibility of the sulphonic acids of amino-diaryls, amino-diaryl ethers, amino-diaryl sulphides or amino-diaryl ureas, and the large number of possible components affords a large scope for the preparation of new dyestuff-sulphonic acids. The new products dye animal, vegetable and artificial fibers fast tints which, in part, have very clear shades.

The following examples serve to illustrate the invention, but they are not intended to limit it thereto; the parts are by weight.

1. 100 parts of the condensation product from 1 mol. of chloranil and 2 mols. of 4.4'-diaminodiphenyl-urea-3.3'-disulphonic acid (obtainable by causing the two components to react in aqueous alcohol with addition of sodium acetate) are heated in 2000 parts of sulphuric acid monohydrate for 1 hour at 130° C. The solution, which is at first red-brown gradually turns blue. After cooling, the sulphonation mixture is poured on ice, filtered with suction and the solid matter is washed until neutral with a sodium chloride solution of 15 per cent. strength. In order to complete the conversion of the dyestuff acid into the sodium salt, the residue is stirred with a sodium carbonate solution, filtered with suction and washed with sodium chloride solution until neutral.

The dyestuff has the following probable constitution

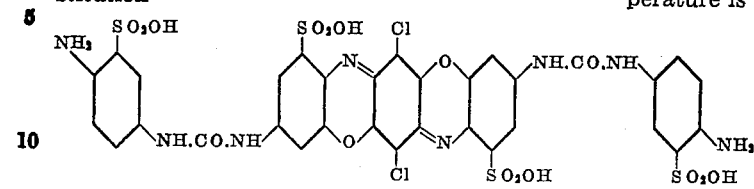

It dissolves in water to a reddish-blue solution and dyes animal and vegetable fiber, as well as viscose artificial silk and mixed fabrics, clear blue tints.

2. 100 parts of the condensation product from 4-amino-diphenylether-2-sulphonic acid and chloranil are introduced at ordinary temperature into 2000 parts of sulphuric acid monohydrate and the whole is heated at about 150° C. to 160° C. until a test portion taken from the mixture and diluted with water no longer becomes brown, but orange. After heating for about 3 hours, the mass is poured on ice, salted out, filtered and the solid matter is washed until neutral and dried. The dyestuff thus obtained dyes cotton beautiful red tints.

A very similar dyestuff is obtained by treating with sulphuric acid monohydrate, as above indicated, the condensation product from 4.4′-diaminodiphenyl-ether-2-sulphonic acid and chloranil.

3. 50 parts of the condensation product from 4-aminodiphenyl-3-sulphonic acid and chloranil having the formula

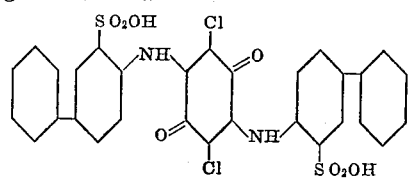

are introduced into 1000 parts of sulphuric acid monohydrate and thereby dissolved. The temperature is then raised until a test portion taken from the mixture and poured into water no longer appears brown but reddish and the temperature is maintained for about 2 hours. After cooling, the mass is poured on ice, salted out, filtered off and the solid matter dried. A dyestuff is obtained which dyes cotton and viscose artificial silk red tints. It has the formula By using instead of the said sulphonic acid the sulphonated 1-phenyl-4-aminonaphthalene or the sulphonated 1-(para-amino-phenyl)-naphthalene a dyestuff is obtained which dyes cotton and viscose artificial silk bluish violet tints.

4. Similar dyestuffs are obtained by using in the foregoing examples instead of chloranil, dichlorobenzoquinone, benzoquinone or toluquinone.

We claim:

The product obtained by heating a compound of the formula with sulphuric acid monohydrate under conditions to effect ring closure, said product having the formula and being a dyestuff which dyes the animal and vegetable fiber, as well as viscose artificial silk and mixed fabrics clear blue tints.

HEINRICH GREUNE.
MAX THIELE.
GERHARD LANGBEIN.